(No Model.)
R. B. LIDDELL.
HUB ATTACHING DEVICE.
No. 534,897. Patented Feb. 26, 1895.
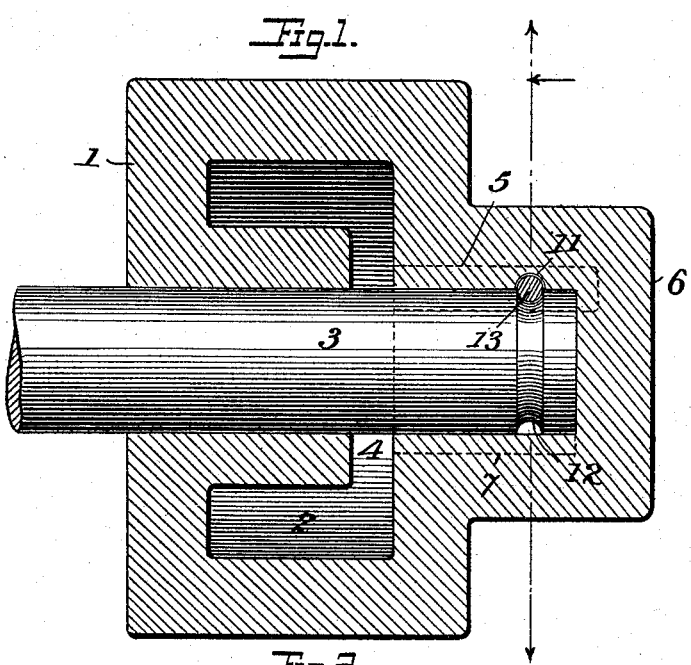
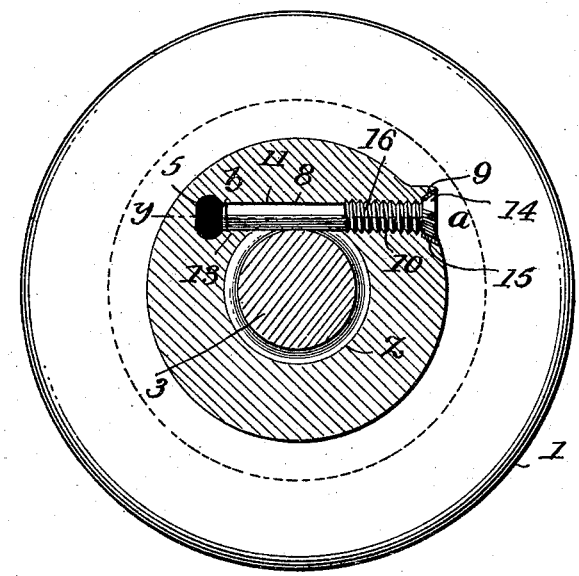
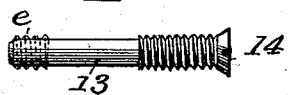
Witnesses
J. G. Hinkel
E. Everett Ellis
Inventor
Robert B. Liddell
by Foster Freeman
Attorneys

UNITED STATES PATENT OFFICE.

ROBERT B. LIDDELL, OF PHILADELPHIA, PENNSYLVANIA.

HUB-ATTACHING DEVICE.

SPECIFICATION forming part of Letters Patent No. 534,897, dated February 26, 1895.

Application filed June 9, 1894. Serial No. 514,098. (No model.)

*To all whom it may concern:*

Be it known that I, ROBERT B. LIDDELL, a citizen of the United States, residing at Philadelphia, in the county of Philadelphia and State of Pennsylvania, have invented certain new and useful Improvements in Hub-Attachment Devices, of which the following is a specification.

This invention relates to certain new and useful improvements in devices for attaching wheel hubs to axles; and it consists substantially in such features of construction and combinations of parts as will hereinafter be more particularly described.

The invention has reference more particularly to that class of hub attaching devices which permit the wheel to revolve or turn freely upon the axle, and is adapted equally to coal and mining cars, as well as to carriages and wagons and other similar vehicles.

The invention may also be employed on either an open or closed hub, and the hub may or may not be provided with oiling or lubricating devices, as preferred.

In some instances heretofore it has been common to form at some point of the axle a continuous circumferential groove, and to insert a pin or screw through a radial opening in the hub so as to have the inner end thereof enter said groove and move therein as the wheel revolves. The objection to this form is that the pin or screw is incapable of withstanding the strain imposed thereon by the lateral movement of the wheel, and it wears away very soon, frequently breaking off or becoming so bent as to have to be removed and replaced by another. In further instances heretofore it has been common to pass a loose pin or key through the hub in such manner that the central portion of the pin rests entirely in the groove of the axle, and thereby furnishing a greater amount of strength or resistance than in the first instance referred to. The objection to this construction, however, is that either a set screw or a nut, or perhaps both, is necessary to retain the pin or key in place, and which moreover requires constant attention or tightening up, since they are very apt to work loose from the jolting of the wheel. The central portion of the key being wholly embedded in the groove on the axle and having no support is also liable to be bent by the lateral play of the hub in service. In still further instances heretofore, the attaching devices have consisted of an independent key-block or clip resting in the groove of the axle, combined with a tapped bolt passing through the hub and holding the block or clip in place. The objection to the arrangement is the number of pieces involved and the complicated nature of the construction, increasing cost in manufacturing, and inconvenience and difficulty in handling.

The object of the present invention is to overcome all of the above objections, and to provide a hub attaching device embodying but a single piece.

A further object of the invention is to provide a hub attaching device deriving maximum bearing surface, and one which cannot work loose or become bent or broken away from any extent of usage.

Further objects of the invention will more fully hereinafter appear when taken in connection with the accompanying drawings, in which—

Figure 1, is a longitudinal sectional view in part elevation, representing a hub attaching device embodying my invention. Fig. 2, is a transverse sectional view, taken on the line $x-x$; and Fig. 3, is a detail view of the attaching screw-pin.

As before stated, my invention is equally adapted to self-oiling wheels, as well as wheels that are supplied with oil or lubricant from time to time, but preferably I have herein shown a wheel constructed with a closed hub, and an oil-chamber for containing a quantity of oil that is supplied continuously to the bearing surfaces or parts. Thus, in the drawings 1, represents the hub having an internal annular oil-chamber 2, leading from which to the surface of the axle 3, is a lateral chamber 4. Also leading from the lateral chamber at any point within the hub is a longitudinal passage 5, which extends outwardly a little short of the end 6, of the hub, and which is for the purpose of conveying oil to the chamber when filling the latter, as hereinafter specified. Instead of the longitudinal passage, I may form longitudinal grooves in the inner side of the hub, as shown at 7, dotted lines, Fig. 1.

In carrying my invention into effect I form in the body of the hub a transverse opening 8, starting, say at the point a, and extending through to the point b, where it communicates with the passage 5. The mouth of the said opening 8, is preferably flaring or conical at 9, or may be of any other desired shape, so as to constitute a seat for the head of the attaching pin to be described; and the said opening is screw-threaded interiorly at 10, also for a purpose to be described. As will be observed, the line "y," representing the central longitudinal axis of said opening 8, intersects or cuts the curved line z, representing the inner circle of the hub, and consequently in forming the opening either by coring or drilling, a portion of the interior of the hub is removed, thereby leaving a straight groove 11, extending across the hub from side to side. The axle it will be seen is formed with a circumferential groove 12, which when the wheel is in place upon the axle, unites with the groove 11, of the hub in forming a complete circular, oval, or other desired shape of opening. When the hub is properly placed upon the end of the axle, I insert within the opening 8, an attaching screw-pin 13, the entire length of which enters and is adapted to the opening, and the head 14, of which is received into the flaring mouth 9, as shown. Beneath this head I preferably insert a leather or other suitable packing or washer 15, so as to render the same secure and oil tight. The said pin is screw-threaded at 16, for a short distance, preferably at the outer end immediately adjacent to the head 14, and this screw-threaded portion is received by the correspondingly screw-threaded portion 10, of the hub opening so that there is no possibility of the pin working loose from lateral motion of the wheel or body of the vehicle, or otherwise. The end of the screw-pin extends through to the end of the opening and stops about flush with the inner side or surface of the passage 5, as shown. From this construction, it will be seen that the two ends of the pin have very large or extended bearings, while at the central portion thereof one-half of the diameter of the pin is received by the groove 11, and the other half enters the circumferential groove in the axle, and thus the greatest possible strength is obtained and the hub so attached as to permit the wheel to easily revolve upon the axle. It will further be seen that my improved attaching device consists of a single piece only and is therefore not subject to the same inconveniences and disadvantages resulting from the use of devices constituted of two or more parts or pieces, as already explained. The screw-pin is not liable to work loose or fall out, and the effect is substantially the same as if the hub and pin were made integral. The opening 8 also furnishes a convenient access to the oil chamber for filling the latter, and when once filled, it will be seen that the oil or lubricant cannot possibly escape even if the screw-pin should fall out, or the wheel be turned over; and this is also a very desirable feature of improvement in this class of inventions.

It is apparent that both the groove of the axle and the opening in the hub could be made at any points thereof desired, that is to say, either at the inner or outer ends, or both, as desired, but preferably I locate or arrange the same at the point indicated.

I have described the screw-pin as being screw-threaded for a short distance directly adjacent the head of the pin, and while such is the preferred construction, it must not be understood that I am confined thereto. Instead of such construction, I might form the said pin with a screw-thread for a short distance from its inner end (see dotted lines e) to be received by a corresponding screw-thread formed in the opening 8, at its inner extremity adjacent the passage 5, which construction is clearly within my invention. In still further instances, I might form the pin and opening with screw-threads at both of the points named, which would, of course, furnish a still more secure fastening for the pin. It is obvious that other or immaterial changes could also be resorted to, and therefore Without limiting myself to the precise details of construction and arrangement shown and described, I claim—

1. In hub attaching devices, the axle having a circumferential groove, the closed hub provided with an oil chamber and the passage 5, and a screw-pin passing through the hub and entering the inner wall of said passage, the said pin being partially received by the axle groove and engaging a thread in the hub, substantially as described.

2. In hub attaching devices, the axle formed with a circumferential groove, the hub having the opening 8, bored therein to constitute the straight groove 11, and being screw-threaded and flaring at its outer extremity, and terminating at its inner end within the body of the hub, in combination with a screw-pin fitting said opening and having a conical head, and a packing or washer beneath said head, substantially as described.

In testimony whereof I have signed my name to this specification in the presence of two subscribing witnesses.

ROBERT B. LIDDELL.

Witnesses:
 GEO. J. MULLER,
 CHAS. C. SCHAFFER.